United States Patent [19]
Messing

[11] 3,850,751
[45] Nov. 26, 1974

[54] ENZYMES IMMOBILIZED ON POROUS INORGANIC SUPPORT MATERIALS

[75] Inventor: Ralph A. Messing, Horseheads, N.Y.

[73] Assignee: Corning Glass Works, Corning, N.Y.

[22] Filed: Feb. 16, 1973

[21] Appl. No.: 332,807

[52] U.S. Cl............... 195/63, 195/68, 195/DIG. 11
[51] Int. Cl.............................................. C07g 7/02
[58] Field of Search................ 195/63, 68, DIG. 11

[56] References Cited
UNITED STATES PATENTS
| | | | |
|---|---|---|---|
| 3,519,538 | 7/1970 | Messing et al. | 195/63 |
| 3,666,627 | 5/1972 | Messing | 195/68 |
| 3,705,084 | 12/1972 | Reynolds | 195/63 |

OTHER PUBLICATIONS

Weetall, H. H., Trypsin and Papain Covalently Coupled to Porous Glass, Science, Vol. 166, 1969, (pp. 615–617).

Hawley, G. G., The Condensed Chemical Dictionary, 8th Ed., Van Nostrand Reinhold Co., N.Y., 1971, (pp. 37, 874, 875 and 956).

Primary Examiner—David M. Naff
Attorney, Agent, or Firm—James A. Giblin; Clarence R. Patty, Jr.

[57] ABSTRACT

An immobilized enzyme composite is disclosed having an enzyme adsorbed to the inner surface of a porous ceramic body consisting of agglomerated metal oxide particles having an average pore diameter of at least as large as the largest dimension of the enzyme but less than 1,000°A.

8 Claims, No Drawings

3,850,751

ENZYMES IMMOBILIZED ON POROUS INORGANIC SUPPORT MATERIALS

RELATED APPLICATIONS

U.S. Pat. applications Ser. No. 332,739, and Ser. No. 332,804, filed herewith of even date in the name of R. A. Messing and respectively entitled "Method of Making Fructose with Immobilized Glucose Isomerase" "Synergistic Enzymes Adsorbed Within Porous Inorganic Carriers."

FIELD

This invention relates generally to immobilized enzyme systems which utilize inorganic materials as carriers for the enzyme. More specifically, the invention is concerned with the bonding of enzymes to highly porous, essentially non-sliceous ceramic materials having a large surface area and an average pore size range which maximizes loading of the enzyme and its half life.

PRIOR ART

Enzymes are proteins which can promote numerous chemical reactions. Most enzymes have a high molecular weight and are generally water-soluble. The water-solubility of enzymes has limited their utility for various applications since it is difficult to remove enzymes from a reaction medium, thus limiting product purity. Further, soluble enzymes can generally be used only one time in a batch-type reaction and, because of high costs associated with many enzymes, the industrial use of enzymes has been limited—even though it is well recognized that enzymes are extremely efficient catalysts. Accordingly, various techniques have been devised to "immobilize," "insolubilize" or "stabilize" enzymes by attaching or bonding them to water-insoluble carrier materials in such a way that the enzyme is rendered immobile yet catalytically active. As used herein, the terms "insoluble" or "insolubilized," when applied to enzymes, refer to enzymes which have been made essentially water-insoluble through attachment to, or entrapment within, a water-insoluble carrier material. The terms "immobile" or "immobilized" refer to enzymes which have been insolubilized in such a manner that they have retained their shape or conformation required for catalysis. The terms "stable" or "stabilized" refer to enzymes which demonstrate a substantial retention of their activity or ability to catalyze reactions over a prolonged period of time.

Enzymes have been rendered essentially insoluble by entrapment within various organic materials and by chemically coupling or adsorbing the enzymes to a wide variety of materials, both organic and inorganic. For example, enzymes have been chemically coupled to such organic carriers as polyaminopolystyrene beads and various cellulose derivatives. It has been found, however, that there are certain disadvantages associated with using organic materials as carriers for enzymes (e.g., swelling, non-rigidity, poor diffusion of substrate, microbial attack, and, because of thermal instability, many organic materials are difficult to sterilize). Hence, considerable attention has been directed in recent years toward immobilizing enzymes by bonding them to various inorganic materials which avoid many of the disadvantages associated with organic materials.

Enzymes have been successfully adsorbed to various siliceous materials having available surface silanol groups as disclosed by U.S. Pat. No. 3,556,945 and enzymes have been chemically coupled through silane coupling agents to other inorganic materials as disclosed by U.S. Pat. No. 3,519,538. Because of the need for an extremely high surface area for loading the enzymes, porous glass particles or beads have been used for both adsorption and chemical coupling of enzymes. A brief description of the relationship of surface area and pore size of porous glass to quantity of enzyme adsorbed to the glass can be found in an article by R. A. Messing, ENZYMOLOGIA, 39, p. 12–14 (1970). However, it has been shown recently in U.S. Pat. application Ser. No. 227,205, assigned to the present assignee, that siliceous carriers such as porous glass have less than desirable long term durability in an alkaline environment, thus limiting their use at an alkaline pH where many enzymes have their pH optimum. Accordingly, as disclosed in the above patent application, it has been found possible to enhance the overall durability, particularly alkaline durability, of such carriers by thinly coating the siliceous carriers with a more durable metal oxide. For example, by thinly coating porous glass with a zirconia coating prior to chemically coupling enzymes to the surface, it is possible to minimize dissolution of the carrier and increase the enzymatic half life of the composite. Unfortunately, there are still certain disadvantages associated with known inorganic enzyme carriers that have limited the use of these materials, especially in industrial applications. For example, the costs associated with enzyme composites consisting of enzymes bonded to known porous inorganic carriers are high due to the costs of preparing the carrier materials. Porous glass, even when not coated, is expensive, and, if not coated, as noted above, it tends to dissolve in an alkaline environment with the consequent release of attached enzymes. Further, the processing steps involved in the preparation of porous glass having a controlled pore size are tedious and expensive, thus further limiting the desirability of using porous glass as an enzyme carrier in industrial applications. These disadvantages have posed problems which were previously thought unavoidable in using inorganic carriers because of the requirement for high surface area (e.g., greater than about 5–10 m$^2$/g). Surprisingly, I have now found that the above disadvantages can be overcome with the novel inorganic enzyme carriers and enzyme composites disclosed more fully hereunder.

SUMMARY OF THE INVENTION

The enzyme composites comprise an enzyme bonded to the inner surface of a water-insoluble, essentially non-siliceous, porous ceramic material having an average pore diameter at least as large as the largest dimension of the enzyme but less than about 1,000A. Being essentially non-siliceous and water-insoluble, the carriers have good alkaline durability. Being ceramic or essentially crystalline, the carrier materials are relatively inexpensive and simple to make. A very critical feature of the carriers is the relationship between the average pore size and the dimension of the enzyme to be bonded to the carrier. The average pore size should be such that loading and half life of the bonded enzyme are maximized and that the enzymes' substrate can readily diffuse into the carrier material and to the bonded enzyme. My preferred enzyme composites comprise an enzyme bonded to the inner surfaces of a porous, essentially non-siliceous ceramic material consisting of agglomerated metal oxide particles selected from the group consisting of alumina, titania, and zirconia. The porous ceramic carrier may comprise more than one of the above metal oxides.

SPECIFIC EMBODIMENTS

The main requirements for the porous inorganic carriers are that they be essentially non-siliceous (e.g., preferably containing no $SiO_2$), generally non-friable, ceramic materials, have a surface area greater than 5 $m^2/g$, and have an average pore diameter at least as large as the largest dimension of the enzyme to be bonded but less than about 1,000A. Although the above minimum surface area can be found in finely divided metal oxide particles, it is important to note that the carriers of this invention must be porous rather than comminuted and that a very critical feature of the enzyme composites is the relationship between the average pore size of the carrier and the largest dimension of the enzyme. The ideal or preferred average pore diameter of a given enzyme depends directly on the largest dimension of the enzyme and, to a limited extent in some cases, on the size of the anticipated substrate for the enzyme if the substrate is larger than the enzyme. In all cases, however, the average pore size of the carrier should be at least as large as the largest dimension of the enzyme but less than about 1,000A and the proper selection of an average pore size within this range will permit diffusion of substrates which are larger than the bonded enzyme.

The average pore size should be at least as large as the largest dimension of the enzyme to permit entry of the enzyme into the internal porous network and mass diffusion of the enzyme throughout the pores. In cases where the enzyme's substrate is larger than the enzyme (e.g., substrates for various proteolytic enzymes) the minimum average pore diameter should be at least as large as the substrate but still less than about 1,000A. The average pore diameter of the carrier should not exceed about 1,000A for two reasons. Firstly, as the average pore size exceeds about 1,000A, the surface area of the carrier (almost entirely internal) available for enzyme bonding is considerably reduced, thus limiting the amount of enzyme loading. Secondly, if an enzyme is bonded within the pores of a carrier having an average pore size greater than about 1,000A, there is a reduction in the amount of protection the rigid pores provide for the enzyme against a turbulent reaction environment. An average pore size which is more than about 1,000A subjects the internally bonded enzyme to stresses which tend to detach the enzyme in, for example, flow-through reactions in which there is a significant pressure drop. As a very practical matter, most enzymes can be effectively bonded within the pores of carriers having an average pore diameter between about 100A and 1,000A, preferably between about 100A and 500A, although it should be stressed that the ideal average pore size of a carrier for a given enzyme depends directly on the enzyme and/or substrate size.

The largest dimension of a given enzyme or substrate can be determined approximately by known means from the molecular weight or by exclusion techniques. In the case of nearly spherical enzymes, the largest dimension will be about equal to the diameter of the molecule. In the more common elongate enzymes, the largest dimension will be about equal to the length of the enzyme.

In determining the preferred average pore size within the above range I have found that, in some cases, consideration must be given to the approximate molecular size of the anticipated substrate upon which the immobilized enzyme will act. For example, when the substrate for a given immobilized enzyme is smaller than the immobilized enzyme, there are generally no problems associated with substrate diffusion through the pores to the bonded enzyme (e.g., glucose and oxygen diffusing to bonded glucose oxidase). However, in some cases, the substrate to be acted upon is equal to or larger than the size of the immobilized enzyme. In these cases, the average pore size of the carrier must be large enough to not only admit the enzyme for bonding within the pores, but also large enough to admit the substrate to the internally bonded enzyme. For example, a common protease such as papain has a molecular weight of about 21,000 and a molecular size of about 48A. If an immobilized papain composite were to be used to hydrolyze, for example, a protein such as $\alpha$-casein, the average pore size of the ceramic carrier would also have to be large enough to admit and permit diffusion of the $\alpha$-casein molecule which is several times as large as the papain and has a molecular weight of about 121,000. In a like manner, if the immobilized papain were to be used to hydrolyze albumin (molecular weight about 40,000 to 70,000), the average pore size of the carrier used to immobilize the papain must also be large enough to permit diffusion of the albumin molecule which is over twice as large as the papain molecule. Thus, in the case of immobilized papain acting on albumin, the minimum of the average pore size range should not be used. Rather, the average pore size of the carrier used to immobilize the papain should be at least 2 to 4 times the size of the papain molecule or at least about 100A to 200A. As noted above, most enzymes can be usefully bonded within carriers having an average pore size between 100A and 1,000A. For example, glucose isomerase has a molecular weight of about 180,000 and a size of about 100A. Thus, that enzyme can be successfully bonded to a porous carrier having an average pore size near the lower end of the practical pore size range since the glucose isomerase acts on a relatively small molecule (glucose) to produce fructose. In a similar manner, urease (about 125A), which also acts on a small substrate, can be bonded to a carrier having an average pore size at the lower end of the pore size range. On the other hand, a very large enzyme such as pyruvate decarboxylase which has a reported molecular weight greater than 1,000,000 requires a carrier having an average pore size closer to the 1,000A size. Obviously, in the case of pyruvate decarboxylase bonded within the porous carriers, the critical pore size range will be smaller than the noted practical average pore size range of 100A to 1,000A for many enzymes. Another example of an enzyme requiring an average carrier pore size range smaller than the more practical range of 100A to 1,000A is catalase which has a molecular weight of about 250,000 and a largest dimension of about 183A. In accordance with this disclosure, that enzyme should be bonded within the pores of a carrier having an average pore size between about 183A and 1,000A. Since the catalase acts on a very small substrate, hydrogen peroxide, consideration need not be given to the substrate size in determining the ideal average pore size within the above ranges for the catalase carrier.

The types of bonding used to attach the enzymes to the internal surface of the porous carrier materials will depend on such factors as the intended use of the resulting composites, costs to prepare the composites, technical feasibility, enzyme activity retention, availability of reagents needed for some types of bonding, and other factors known to those skilled in the art. In general, there are three methods through which enzymes may be bonded to the internal surfaces of inorganic carriers. The enzymes may be adsorbed directly to the carrier in a method similar to that disclosed in U.S. Pat. No. 3,556,945. The enzymes may be chemically coupled to the carrier (indirectly) through intermediate silane coupling agents, as disclosed in U.S. Pat. No. 3,519,538 and U.S. Pat. No. 3,669,841. Lastly, the enzymes may be adsorbed and crosslinked within the pores of the carrier in a manner similar to that disclosed in U.S. Pat. application Ser. No. 278,269, assigned to the present assignee. Prior to bonding an enzyme to the porous ceramic carriers, it is only necessary that the carrier surface have available oxide or hydroxyl groups. These surface groups permit enzyme bonding via adsorption, adsorption and crosslinking within the pores, and via chemical coupling through intermediate compounds having at least one portion which can react with the above groups. As used herein, the term "bonded" where applied to enzymes refers to any of the above three modes of attachment within the pores of inorganic carriers, or combinations of any of the modes of attachment. In the examples below which illustrate the effect of carrier pore size on the stability of the enzyme composites, the enzymes were bonded to the carrier by adsorption techniques similar in principle to those described in U.S. Pat. No. 3,556,945.

Very important to the successful preparation and subsequent use of the enzyme composites is the mesh size (U.S. Standard Sieve) of the porous ceramic carriers. To fully utilize the internal surface area of the porous carrier, the enzyme must be able to diffuse deeply into the porous structure of the carrier prior to bonding to the internal surface. Further, once the enzyme has been bonded, the utility of the resulting enzyme composite depends greatly on how easily the enzyme's substrate can diffuse deeply into the pores to be acted upon by the deeply bonded enzymes. The diffusion of the enzyme into the pores prior to bonding is governed by several factors such as carrier pore sizes, carrier particle size, pH, isoelectric point of the enzyme, time and temperature. I have found, as a practical matter, that a preferred average mesh size of the carrier for both diffusion of the enzyme prior to bonding and diffusion of the substrate subsequent to bonding should be between about 4 and 200 mesh, U.S. Standard Sieve. Porous carrier particles of greater than about 4 mesh size require an undue amount of time for enzyme diffusion deep enough to fully utilize the internal surface area. Further, when the prepared enzyme composite is to be used in a column through which substrate continuously flows, the carrier for the composite should not exceed about 4 mesh size since a carrier particle size larger than that requires a greater substrate residence time, presents diffusion problems, and, in general, this results in an uneconomical enzymatic catalysis. On the other hand, when the carrier particle size is smaller than about 200 mesh, it becomes difficult to retain the particles containing the bonded enzyme in a column and, because of a tighter packing, there results an undesirably large pressure drop through the column, generally requiring reinforcing equipment. For column use of the enzyme composites, I have found that a very preferred carrier particle size range is between about 25 and 80 mesh, U.S. Standard Sieve.

The general techniques for preparing the enzyme composites is as follows: First an essentially non-siliceous porous ceramic body having an average pore size at least as large as the largest dimension of the enzyme but less than 1,000A is chosen and the porous carrier is ground and sieved to the desired mesh size. Preferably, the porous bodies have a substantially uniform pore distribution. Various nonsiliceous porous ceramic carrier particles having the desired average pore size can be used such as porous alumina, porous titania, porous zirconia, or combinations thereof and of other essentially water-insoluble metal oxides. Once the porous bodies of a given average pore size and mesh size are acquired or prepared, they are preconditioned or hydrated with a suitable buffer for the subsequent bonding procedure to assure the formation and/or retention of maximum surface oxide or hydroxyl groups. For example, when glucose isomerase is to be adsorbed to a porous alumina body, hydration with a buffer at a pH above 7.0 is preferred. To bond enzymes by adsorption, the buffer system is first removed from the particles but the particles are kept wet prior to actual adsorption. The enzyme to be adsorbed is then added to the wet carrier particles at a concentration per unit weight of carrier which will permit optimum adsorption of the enzyme or maximum loading in view of the available surface area.

The adsorption process is facilitated and mass diffusion of the enzyme into the pores is hastened, by stirring, circulation, inversion, use of a fluidized bed reactor containing the carrier, or other known means for forming an agitated reaction environment. The time required for optimum adsorption will depend, of course, on the carrier, the carrier pore size, the carrier particle size, the size and molecular spin characteristics of the enzyme, temperature, pH, agitation, and other factors, but the adsorption process should be for at least one-half hour to assure sufficient adsorption and loading. To assure maximum loading for most enzymes, the minimum adsorption period should be between 1 ½ and 5 hours. As a general rule, the pH of the solution from which adsorption occurs should be chosen so that the surface charge of the enzyme is opposite the surface charge of the carrier surface. After adsorption, any loosely held enzyme is removed by thorough washing of the composite in water, saline (e.g., 0.5M NaCl), or any other washing medium which will have no detrimental effect on the composite or attached enzyme.

In use, the enzyme composite may be held in a plug flow-through column, a continuous stirred tank reactor, fluidized bed reactor, or any other vessel into which or through which substrate can be introduced for incubation with the immobilized enzyme. In the examples below, the enzymatic activities of some of the enzyme composites were periodically determined under both static and dynamic conditions. From the examples in which activity was determined under dynamic conditions (e.g. using the composites as they would be used for their intended applications) it was possible to determine the enzymatic half life of the composites. The enzymatic half life of a given enzyme composite refers to that period of time required for the composite to lose one half of its initial activity under dynamic conditions of use. Obviously, the longer the half life is for a given composite, the more valuable the composite becomes. With my composites, I was able to attain remarkably long half lives, thus indicating a high likelihood of success in industrial applications and a more economical means for using immobilized enzymes in research applications since the immobilized enzymes may be easily removed from reactions and later reused. The composites were also found to retain their stability on storage. In most applications for the immobilized enzyme composites, a continuous process is preferred over batch-type reactions for economic reasons and, as noted, the enzyme composites work well in a plug flow-through column. The column may be jacketed with a water bath to maintain an optimum incubation temperature and/or a temperature compatible with maximizing the half life of the enzyme composite. For example, in preparing fructose from a glucose-containing substrate with an adsorbed glucose isomerase composite, I have found that an incubation temperature of about 60°C. not only assures efficient isomerization but also assures a relatively long half life for the enzyme composite. The incubation pH range and buffer system will also depend on the enzyme system used. In using immobilized glucose isomerase, I have found that isomerization of glucose to fructose proceeds well at a pH between 7.2 and 8.2 with a pH range of 7.4 to 7.8 being especially preferred. Generally, the choice of a buffer system depends on the degree of acidity or alkalinity found in the substrate caused by the substrate solution itself and/or the presence of various activating ions which may be added to the substrate and the pH optimum of the immobilized enzyme. The various buffer systems which may be used for a given immobilized enzyme system are in many cases known. In other cases, they may be readily determined by one skilled in the art.

In the following illustrative examples, porous ceramic bodies consisting of various non-siliceous metal oxides having a range of pore sizes between 140A and 985A were used as carriers for the enzymes indicated. The particle size of all carriers was between about 25 to 80 mesh, as indicated. The non-siliceous porous ceramic carriers and the average pore size in Angstroms (A) of each sample used were:

$Al_2O_5$ — (175A)
$ZrO_2$ — (175A)
$TiO_2$ — (350A) (420A) (820A) (855A)
$TiO_2$-$Al_2O_3$ — (220A)

The mixed $TiO_2$-$Al_2O_3$ porous body (220A average pore size) consisted of about 44% $TiO_2$ and 56% $Al_2O_3$ on a weight basis.

EXAMPLE I

Glucose Isomerase Adsorbed to Porous $Al_2O_3$

The above composite was prepared by adsorbing glucose isomerase (largest molecular dimension about 100A, molecular weight 180,000) to porous alumina bodies having the following physical characteristics:

Porous $Al_2O_3$ Carrier

| | |
|---|---|
| Average Pore Diameter | 175A |
| Minimum Pore Diameter | 140A |
| Maximum Pore Diameter | 220A |
| Pore Volume | 0.6 cm$^3$/g |
| Surface Area | 100 m$^2$/g |
| Particle Mesh Size | 25-60 |

The enzyme used in preparing the composites consisted of a crude glucose isomerase preparation containing 444 International Glucose Isomerase Units (IGIU) per gram. The enzymatic activity of the glucose isomerase and the immobilized enzyme composites made therewith was determined via a modified cysteine-carbazole assay method. The immobilized glucose isomerase composite was prepared as follows. A solution of 28.7 ml. of 0.1M magnesium acetate was added to 5 g of the abovedescribed crude glucose isomerase preparation. The slurry was stirred for 25 minutes at room temperature and then filtered through filter paper. The residue on the paper was washed with 14.3 ml. of 0.1M magnesium acetate solution followed by 14.3 ml. of 0.5M $NaHCO_3$ and 4.3 ml. of 0.5M $NaHCO_3$. The washes were collected directly into the original enzyme filter paper and the total volume of the enzyme wash solution was about 50 ml.

Five hundred milligrams of the above-described porous alumina were placed in a 50 ml. round bottom flask. Ten ml. of the above glucose isomerase solution was then added to the flask. The flask was attached to a rotary evaporator. Vacuum was applied to the apparatus and the flask was rotated in a bath maintained between 30° and 45°C. over a 25 minute period. An additional 10 ml. of glucose isomerase solution was then added to the flask, and evaporation was continued over the next 35 minute period under the same conditions. The procedure was repeated two more times and then a final 7 ml. aliquot of glucose isomerase was added to the flask and evaporation was continued for an additional 1 hour and 10 minutes at 45°C. The flask and contents were removed from the apparatus and placed in a cold room over a weekend. A total of 47 ml. of glucose isomerase solution had been added to the porous alumina particles.

Fifty ml. of buffer (0.01M sodium maleate, pH 6.8 to 6.9, containing 0.001 cobalt chloride and 0.005M magnesium sulfate) was added to the enzyme composite and the sample was extracted over the next hour at room temperature. The 50 ml. extract was saved for assay. The composite was then washed with 200 ml. of water, followed by 10 ml. of 0.5M NaCl. The final wash was performed over a fritted glass funnel with 50 ml. of water. The enzyme composite was then transferred to a 50 ml. Erlenmeyer Flask and stored in buffer at room temperature with periodic assays of the total sample over a 106 day period. Over the assay period, the average assay value for the composites was 130 IGIU per 500 mg composite, the enzyme activity recovery on the composite being 6%. The average assay value was determined by making a total of 20 assays over the 106 day period with 16 of the assays showing an activity between 100 and 150 IGIU per 500 mg. of composite (200-300 IGIU per gram). The above results indicated a high degree of static stability for the composite at a relatively high enzyme loading value. The extract solution which had been saved was assayed and found to have 39.8 IGIU per ml, indicating the enzyme activity recovery in the extract was 90%.

EXAMPLE II

Since the value of the glucose isomerase composite depends on its performance under dynamic conditions, the following experiment was performed to determine the efficiency of the enzyme composite in isomerizing glucose to fructose under conditions which would be anticipated in an industrial application. The importance of being able to economically produce fructose from a relatively less expensive glucose-containing solution is well known in view of the higher sweetening value of fructose (twice glucose) of flucose) which permits a comparable sweetness at about one-half the caloric intake.

The isomerization experiment was performed by placing 10 g of the immobilized glucose isomerase composite in water-jacketed columns, thermostated to 60°C., through which a 50% glucose solution was pumped at a flow rate necessary to maintain the fructose conversion between 80 and 85% theoretical by reducing the flow rate over various intervals. The initial flow rate was about 190 ml. per hour. The preparation of the composites and the subsequent reaction conditions are as follows:

Eleven grams of the porous alumina bodies described in Example I were placed in a 100 ml. glass stoppered cylinder and pretreated with the addition of 100 ml. of 0.05M magnesium acetate and 0.01M cobalt acetate, pH 7.5. The cylinder was stoppered and placed in a 60°C. bath after mixing by inversion. After 15 minutes of reaction, the cylinder was inverted and the fluid was decanted. One hundred ml. of fresh magnesium-cobalt acetate (described above) was added to the cylinder which was mixed by inversion and allowed to stand at room temperature for 2 ½ hours.

Prior to the adsorption process, a crude enzyme solution consisting of 590 IGIU per ml. in 0.6 saturated ammonium sulfate was purified as follows: To 40 ml. of the glucose isomerase solution, 1.4 additional grams of ammonium sulfate was added to precipitate the enzyme and the slurry was stirred at room temperature for 20 minutes. The sample was then centrifuged at 16,000 RPM at 2°C. for 30 minutes. The supernatent fluid was decanted and discarded. Twelve ml. of the above magnesium-cobalt acetate solution was added to the precipitate and stirred, and then 3 ml. of 0.5M sodium bicarbonate was added to the enzyme solution and mixed to dissolve. The solution was placed in a 60°C. water bath for 15 minutes. After removal from the bath, the solution was centrifuged for 15 minutes at 16,000 RPM and 2°C. The clear supernatent enzyme solution was decanted and the precipitate was discarded. The enzyme solution (28 ml.) was found to have a pH of 7.5. If no activity was lost during the purification procedure, the solution would have been expected to contain about 23,600 IGIU of activity.

Once the enzyme had been prepared, the adsorption process followed. The magnesium-cobalt acetate solution was decanted from the porous alumina bodies after inversion. The enzyme solution, 28 ml., was added to the porous alumina in a cylinder. The cylinder was stoppered, mixed by inversion, and then placed in a 60°C. water bath. The enzyme was permitted to diffuse into the pores and react with the porous alumina over a two hour and thirty minute interval at 60°C. During this period, the cylinder was mixed by inversion every 15 minutes. After removal from the 60°C. bath, the reaction was continued at room temperature with mixing by inversion at 30 minute intervals over the next 2 hours. The reaction was continued overnight at room temperature after which the enzyme solution was decanted (volume 28.5 ml., pH 7.1) and saved for further assay. The immobilized enzyme composite was washed with 60 ml. of distilled water followed by 40 ml. of 0.5M NaCl, and finally by 40 ml. of magnesium-cobalt acetate solution. Three small samples (totaling about 1 g) were removed from the batch for the assay determinations.

The remaining 10 grams were transferred to a column thermostated at 60°C. The column was fed with a solution containing 50% glucose and 0.005M magnesium sulfate, buffered with sodium sulfite to a pH of 7.7 to 8.0. During the initial 26 hours, 0.001M cobalt chloride was added to the feed of the column. After 26 hours, the cobalt was no longer included in the feed and the only activator present was magnesium ions during the remainder of the column life. The column was run, as noted above, at an initial flow rate of 190 ml. per hour and periodically reduced to maintain a conversion rate between 80 and 85% of theoretical (100% theoretical fructose would result in a product containing 50% fructose-50% glucose, thus making an 80–84% conversion level yield about 40 to 42 ½% fructose). The column was run for 31 days, at which time the column dried out due to a shortage of feed. Over the 31 days of column operation, samples of products were collected and the amount of fructose produced in grams per hour was determined. Since the flow rate was periodically reduced to maintain a constant conversion rate of 80–85%, the amount of fructose produced per hour on a given day is an accurate reflection of the enzyme's activity in the column. Thus, it was found that since the initial loading of the carrier was 381 IGIU per gram, the total column contained 3810 IGIU which, over a 31 day period yielded 42 to 28 grams of fructose per hour, the half life of the composite was about 42 days. The above experiment indicated a high degree of stability for the enzyme composite and it is thought this is attributable to tailormaking the carrier to have an optimum average pore size range for the glucose isomerase carrier.

EXAMPLES III AND IV

Glucose Isomerase Adsorbed to Porous $ZrO_2$ and Porous $TiO_2$-$Al_2O_3$

Immobilized glucose isomerase composites were made using two other carriers having the following characteristics and consisting of $ZrO_2$ and a combination of 44% $TiO_2$ and 56% $Al_2O_3$ (each on a weight basis).

Porous $ZrO_2$ and Porous $TiO_2$-$Al_2O_3$ Carriers

| | $ZrO_2$ | $TiO_2$-$Al_2O_3$ |
|---|---|---|
| Average Pore Diameter (A) | 175 | 220 |
| Minimum Pore Diameter (A) | 140 | 140 |
| Maximum Pore Diameter (A) | 200 | 300 |
| Pore Volume (cc/g) | 0.23 | 0.5 |
| Surface Area (m²/g) | 50 | 75 |
| Particle Mesh Size | 25–60 | 25–60 |

A 500 milligram sample of the porous $ZrO_2$ and 300 mg of the $TiO_2$-$Al_2O_3$ carrier were pretreated separately with a 0.05M magnesium acetate-0.01M cobalt acetate solution, pH 7.5 at 60°C. for 15 minutes and then at room temperature for 3 hours. The treating solution was then decanted and then 0.8 ml. (672 IGIU) of a glucose isomerase solution purified as in Example II was added to the carriers for bonding. The adsorption step was carried out at 60°C. for 4 hours with mixing by inversion every 15 minutes. The adsorption procedure was continued overnight at room temperature without mixing after which the remaining enzyme solution was decanted.

The resulting immobilized glucose isomerase composites were then each washed with a 0.5M NaCl solution, followed by a wash with a 0.05M magnesium acetate-0.01M cobalt acetate solution (pH 7.5), and lastly washed with distilled water. The washed composites were stored separately at room temperature in water. The composites were then assayed for glucose isomerase activity over an 18 day period with the following results for the composites using each carrier expressed in International Glucose Isomerase Units (IGIU) per gram of respective carrier.

TABLE I

Static Assay at 60°C. Activity in IGIU/g

| Carrier (average pore size A) | | |
|---|---|---|
| Day | $ZrO_2$ (175A) | $TiO_2$-$Al_2O_3$ (220A) |
| 0 | 53.6 | 259 |
| 3 | 50.0 | 259 |
| 6 | 43.6 | 213 |
| 11 | 57.4 | 213 |
| 12 | 41.6 | 199 |
| 18 | 38.9 | 198 |

As can be seen from the results the use of both carriers resulted in a stable immobilized enzyme with the $TiO_2$-$Al_2O_3$ (having a larger average pore diameter, larger surface area and larger pore volume) providing a higher loading of active enzyme.

EXAMPLES V AND VI

Papain Adsorbed to Porous $TiO_2$ and Porous $TiO_2$-$Al_2O_3$

Carriers having the following physical characteristics were used to prepare immobilized papain composites:

Porous $TiO_2$ and Porous $TiO_2$-$Al_2O_3$ Carriers

| | $TiO_2$ | $TiO_2$-$Al_2O_3$ |
|---|---|---|
| Average Pore Diameter (A) | 350 | 220 |
| Minimum Pore Diameter (A) | 220 | 140 |
| Maximum Pore Diameter (A) | 400 | 300 |
| Pore Volume (cc/g) | 0.45 | 0.5 |
| Surface Area (m²/g) | 48 | 77 |
| Particle Mesh Size | 25–60 | 25–60 |

Five hundred milligram samples of each carrier were separately preconditioned with 9 ml. of 0.5M $NaHCO_3$ solution for 1 ½ hours at 37°C. in a shaking water bath. The buffer was then decanted and the carriers were washed with distilled water. Ten grams of papain (molecular weight 21,000 and largest dimension 48A) suspended in 50 ml. of 0.2M phosphate buffer solution, pH 6.95, and containing 86 mg of cysteine hydrochloride and 37 mg disodium E.D.T.A. was adsorbed to the respective carriers and the resulting composites were assayed with casein (molecular weight 121,000) as generally described in U.S. Pat. No. 3,556,945. The adsorption method and periodic assay results were as follows.

Ten ml. (containing 2 grams of enzyme) of the papain solution were added to each carrier and the adsorption was allowed to proceed for 3 hours at 37°C. in a shaking water bath. Then the adsorption was allowed to continue overnight at room temperature without shaking. The enzyme solution was then decanted, the composites were washed with distilled water, then washed with 0.5M NaCl, and then again with distilled water prior to storage in water at room temperature. The composites were then assayed with casein over a 15 day period and found to have the following activities expressed in mg active papain/g carrier.

TABLE II

Static Assay at 37°C. Activity in mg Papain/g Carrier

| Carrier (average pore size A) | | |
|---|---|---|
| Day | $TiO_2$ (350A) | $TiO_2$-$Al_2O_3$ (220A) |
| 0 | 7.41 | 9.06 |
| 5 | 6.82 | 6.80 |
| 6 | 3.84 | 4.85 |
| 15 | 2.24 | 4.00 |

EXAMPLES VII AND VIII

Alkaline *Bacillus subtilis* Protease Adsorbed To Porous $TiO_2$ and Porous $TiO_2$-$Al_2O_3$ Carriers similar to those of Examples V and VI were used for the adsorption of alkaline *B. subtilis* protease which has a molecular weight of 27,000 and a largest dimension of 42A. The enzyme composites were prepared by using a solution consisting of 10 g of the alkaline protease suspended in 50 ml. of 0.1M phosphate buffer, pH 7.8. Ten ml. (2 g enzyme) of the protease solution was added to 500 mg samples of each carrier (350A $TiO_2$ and 220A $TiO_2$-$Al_2O_3$) and the adsorption procedure was similar to that used in the papain examples above.

The resulting composites were assayed with casin (molecular weight 121,000) in the same manner as that described in U.S. Pat. No. 3,556,945 except that the substrate solution contained 0.1M phosphate buffer and the pH of the assay was 7.4. No cysteine hydrochloride or E.D.T.A. was present in the assay samples. The assay results over a 15 day period were as follows with the activity of the immobilized alkaline protease composites expressed in mg of active alkaline protease per gram of carrier.

TABLE III

Static Assay Activity in mg Alkaline Protease/g Carrier

| | Carrier (average pore size A) | |
|---|---|---|
| Days | $TiO_2$ (350A) | $TiO_2$-$Al_2O_3$ (220A) |
| 0 | 5.47 | 4.69 |
| 5 | 3.60 | 1.57 |
| 6 | 1.17 | 0.64 |
| 15 | 0.67 | 0.40 |

EXAMPLES IX–XIII

Urease Adsorbed to Carriers of Varying Pore Size

Immobilized urease composites may be used to measure blood urea nitrogen since urease will selectively hydrolyze urea to measurable amounts of $NH_3$ and $CO_2$ which can be related to urea concentration. In the examples below, urease was bonded to various porous ceramic carriers having pore sizes ranging from 140A to 985A and average pore diameters ranging from 175A to 855A to determine an optimum carrier pore size for that enzyme. Urease has a molecular weight of about 480,000 and a largest dimension of about 125A when the enzyme exists as a monomer and about 250A as a dimer. Inasmuch as the substrate for urease, urea, is extremely small relative to the enzyme, consideration need not be given the substrate size in making an initial determination of suitable average pore size range for the carrier. This is in direct contrast to effect of the casein substrate on determining a carrier pore size range for immobilized papain. In the examples below, urease was bonded to porous $Al_2O_3$, porous $TiO_2$, and porous $Al_2O_3$-$TiO_2$ carriers having the following physical characteristics:

|  | Porous Carrier | | | | |
|---|---|---|---|---|---|
|  | $Al_2O_3$ | $Al_2O_3$-$TiO_2$ | $TiO_2$ | $TiO_2$ | $TiO_2$ |
| Average Pore Diameter (A) | 175 | 220 | 350 | 420 | 855 |
| Minimum Pore Diameter (A) | 140 | 140 | 220 | 300 | 725 |
| Maximum Pore Diameter (A) | 220 | 300 | 400 | 590 | 985 |
| Pore Volume (cc/g) | 0.6 | 0.5 | 0.45 | 0.4 | 0.22 |
| Surface Area (m²/g) | 100 | 77 | 48 | 35 | 9 |
| Particle Mesh Size | 25–60 | 25–60 | 25–60 | 30–80 | 25–80 |

Five hundred milligram samples of each of the above carriers were pre-conditioned by shaking the samples in 11 ml. of 0.5M $NaHCO_3$ at 37°C. for one hour and 40 minutes after which the $NaHCO_3$ solution was decanted. To each 500 mg sample of carrier was added 20 ml. of a 1% aqueous urease suspension which contained 400 Sumner Units (S.U.) of urease activity per gram or 80 S.U. per sample. The carrier samples and the urease solutions were shaken in a water bath at 37°C., for 5 hours. The mixture was then allowed to stand at room temperature for 22 hours after which the enzyme solution was decanted and the enzyme composites were washed successively with distilled water, 0.5M NaCl solution and distilled water. The composites were then transferred to small columns where they were assayed at room temperature over a period of up to 32 days. The assay results below show the activity in each composite expressed in Sumner Units of Urease Activity found in using carriers of the various average pore sizes indicated.

TABLE IV

| | Composite Activity (S.U./g) Using Carriers of Various Pore Sizes | | | | |
|---|---|---|---|---|---|
| Days | $Al_2O_3$ (175) | $Al_2O_3$-$TiO_2$ (220) | $TiO_2$ (350) | $TiO_2$ (420) | $TiO_2$ (855) |
| 0 | 0.35 | 0.81 | 1.18 | 4.36 | 2.46 |
| 0 | 0.22 | — | — | — | — |
| 1 | 0.11 | — | — | — | — |
| 4 | — | 0.59 | 0.63 | 2.32 | 1.77 |
| 5 | 0.05 | 0.45 | 0.43 | 1.98 | 0.95 |
| 6 | | 0.06 | 0.33 | 1.98 | 0.61 |
| 7 | | 0.05 | 0.29 | 1.56 | 0.36 |
| 11 | | 0.03 | 0.16 | 1.11 | 0.19 |
| 18 | | 0.03 | 0.11 | 0.73 | 0.09 |
| 27–28 | | 0.01 | 0.07 | 0.47 | 0.03 |
| 32 | | — | 0.05 | 0.34 | — |

From the above table, it can be seen that an optimum average pore size of a porous ceramic carrier for urease is about 420A even though a smaller amount of enzymatic activity is retained with composites using carriers having an average pore size as low as 175A or as high as 855A.

EXAMPLES XIV AND XV

The criticality of having a carrier average pore diameter at least as large as the enzyme is further demonstrated in the following examples in which two different enzymes were simultaneously adsorbed within the pores of porous inorganic carriers having an average pore diameter which in one case was smaller than the larger enzyme and, in another case, larger than the larger enzyme. The enzymes simultaneously adsorbed were glucose oxidase and catalase having the following characteristics:

Glucose Oxidase (molecular weight 150,000; largest size 84A)

Catalase (molecular weight 250,000, largest size 183A)

The above enzymes were adsorbed to a porous alumina carrier (described in Example I) and a porous titania carrier (described in Example V) having average pore diameters of 175A and 350A, respectively. the adsorption process is that described in U.S. Ser. No. 332,804, filed herewith and cited as a related application.

Glucose oxidase acts on glucose with oxygen to yield gluconic acid and hydrogen peroxide. For this reaction oxygen is continuously needed. However, as the hydrogen peroxide is produced, it tends to deactivate the enzyme by oxidizing it. By simultaneously adsorbing catalase with the glucose oxidase, the deactivation is minimized or avoided since catalase acts on a hydrogen peroxide substrate and yields oxygen needed by the glucose oxidase. The exclusion of the larger catalase molecule (183A) from the smaller average pore size alumina (175A) is indicated in the table below which shows activity retention in glucose oxidase units (GOU) over a 165 day period when carriers having average pore diameters of 175A and 350A, respectively are used.

TABLE V

Comparison of Glucose Oxidase Activities (GOU) per Gram of Porous $Al_2O_3$ and Porous $TiO_2$

| | Carrier | |
|---|---|---|
| Assay Day | Example XIV Porous (175A) $Al_2O_3$ | Example XV Porous (350A) $TiO_2$ |
| 1 | 12.9 | 20.5 |
| 1 | 18.7 | 36.2 |
| 4 | 11.7 | 36.2 |
| 5 | 10.1 | 36.2 |
| 6 | 8.5 | 36.2 |
| 7 | 7.0 | 36.2 |
| 38 | Results too low to measure | 32.5 |
| 59 | — | 36.2 |
| 83 | — | 35.9 |
| 103 | — | 35.5 |
| 136 | — | 32.5 |
| 165 | — | 29.6 |

The above activities were determined by placing 300 mg samples of each composite in a flow through column into which a standard assay glucose solution was introduced at a flow rate of 145 ml/hr. GOU's were determined indirectly by periodically measuring gluconic acid concentrations.

EXAMPLES XVI-XIX

Additional 300 mg composites were made comprising glucose oxidase and catalase adsorbed to porous titania carriers having average pore sizes of 350A, 420A, 820A, and 855A having the following characteristics:

TABLE VI

| | Porous Carriers | | | |
|---|---|---|---|---|
| | $TiO_2$ | $TiO_2$ | $TiO_2$ | $TiO_2$ |
| Average Pore Diameter (A) | 350 | 420 | 820 | 855 |
| Minimum Pore Diameter (A) | 220 | 300 | 760 | 725 |
| Maximum Pore Diameter (A) | 400 | 590 | 875 | 985 |
| Pore Volume (cc/g) | 0.45 | 0.4 | 0.2 | 0.22 |
| Surface Area ($m^2/g$) | 48 | 35 | 7 | 9 |
| Particle Mesh Size | 25-60 | 30-80 | 25-80 | 25-80 |

The actual process of adsorbing the glucose oxidase and catalase to the above carriers is described fully in U.S. Ser. No. 332,804.

The composites were periodically assayed over a 42 day period as in the above examples but by introducing the substrate into the columns a higher flow rate of 390 ml/hr. At this higher flow rate, an increase in the apparent GOU activity would be expected since diffusion of the substrate is enhanced.

TABLE VIII

Comparison of Glucose Oxidase Activities (GOU) Per Gram of $TiO_2$ Carriers of Increasing Average Pore Diameters

| | $TiO_2$ Carrier Average Pore Size (A) | | | |
|---|---|---|---|---|
| Assay Day | 350A | 420A | 820A | 855A |
| 0 | 66.0 | 56.4 | 43.9 | 37.8 |
| 3 | 66.0 | 77.7 | 43.9 | 39.7 |
| 8 | 66.0 | 84.5 | 46.2 | 40.3 |
| 13 | 66.0 | 84.5 | 46.2 | 44.3 |
| 42 | 66.0 | 80.5 | 40.3 | 42.0 |

As can be seen from the table, in all four composites the long term activity of the glucose oxidase (GOU/g) is remarkably stable. This is particularly true in the composites using the porous titania having an average pore size of 350A since no activity loss was detected over a 42 day period under assay conditions in which there was an increased flow rate (390 ml/hour v. 145 ml/hour) of substrate solution because of which one would expect increased enzyme detachment. As the average pore diameter of the carrier increased, beyond 420A, there was found a decrease in enzyme loading and this is attributable to the decreased surface area (7-9 $m^2/g$) found in the porous $TiO_2$ carriers having average pore sizes of 820A and 855A. The composites using the porous titania having an average pore diameter of 420A showed the highest loading in terms of GOU/g and for this reason a porous inorganic carrier having similar properties (minimum pore diameter of 300A and maximum pore diameter of 590A, etc.) is preferred for a synergistic glucose oxidase-catalase system. Even the composite having a carrier of an average pore size of 855A (with a minimum pore diameter of 725A and a maximum pore diameter of 985A) was remarkably stable although the number of GOUs/g is reduced because of less surface area for adsorption.

It is thought that, given the teachings of this disclosure, an ideal carrier average pore size for a given enzyme can be readily determined by simple experimentation once the largest dimension of the enzyme or, if necessary, the largest dimension of the substrate, is known. Accordingly, it is intended that the scope of this invention should be limited only by the following claims.

I claim:

1. An immobilized enzyme composite comprising an enzyme adsorbed to the inner surface of a porous, essentially non-siliceous ceramic body having an average pore diameter at least as large as the largest dimension of the enzyme and between about 100A and 500A, the porous ceramic body consisting of agglomerated metal oxide particles selected from the group consisting of alumina, titania, and zirconia and mixtures thereof and the porous ceramic body being a particle having a particle size between about 4 and about 200 mesh, U.S. Standard Sieve.

2. The composite of claim 1 wherein the ceramic body has a surface area greater than 5 $m^2/g$.

3. The composite of claim 2 wherein the average particle size of the ceramic body is between about 25 and 80 mesh, U.S. Standard Sieve.

4. The composite of claim 3 wherein the enzyme is glucose isomerase and the ceramic body comprises porous alumina having an average pore diameter between 140A and 220A.

5. The composite of claim 3 wherein the enzyme is papain and the ceramic body comprises porous titania having an average pore diameter between 220A and 400A.

6. The composite of claim 3 wherein the enzyme is an alkaline protease and the ceramic body comprises porous titania having an average pore diameter between 220A and 400A.

7. The composite of claim 3 wherein the enzyme is glucose isomerase and the ceramic body comprises porous zirconia having an average pore diameter between 140A and 200A.

8. The composite of claim 3 wherein the enzyme is urease and the ceramic body comprises porous titania having an average pore diameter about 420A.

* * * * *

UNITED STATES PATENT OFFICE
CERTIFICATE OF CORRECTION

Patent No. 3,850,751　　　　　　　　　　Dated November 26, 1974

Inventor(s) Ralph A. Messing

It is certified that error appears in the above-identified patent and that said Letters Patent are hereby corrected as shown below:

Abstract, line 4, delete "of".

Column 9, line 14, "(twice glucose) of flucose)" should be -- (twice that of glucose) --.

Column 10, line 27, "80-84%" should be -- 80-85% --.

Signed and sealed this 17th day of June 1975.

(SEAL)
Attest:

RUTH C. MASON
Attesting Officer

C. MARSHALL DANN
Commissioner of Patents
and Trademarks